Figure 1:
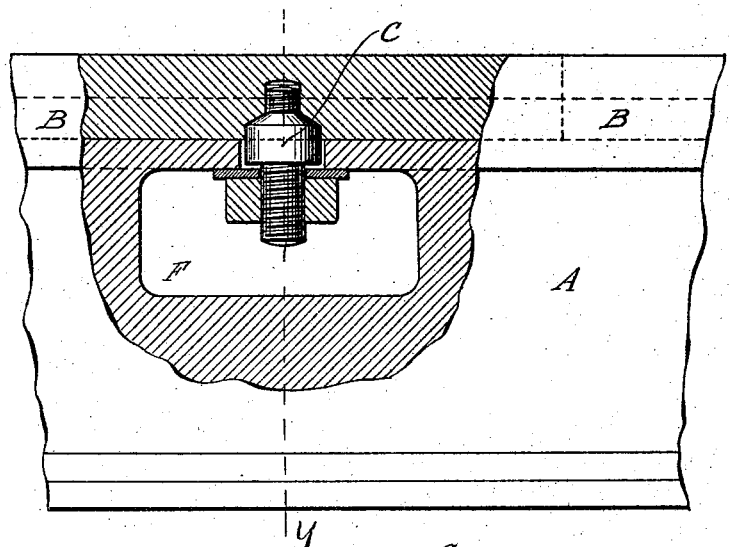
Figure 2:
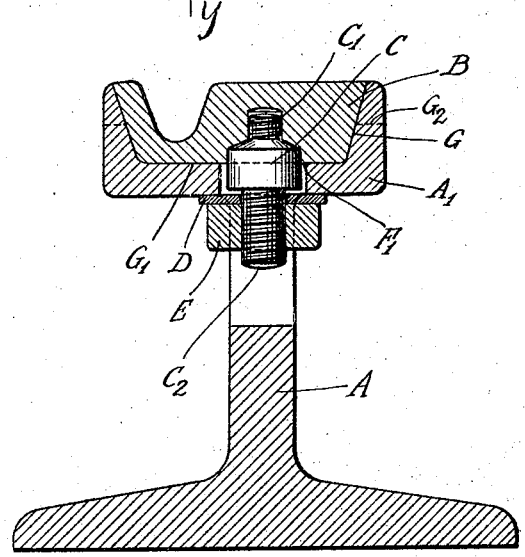

F. ADAMS.
TRAMWAY RAIL HAVING REMOVABLE TREAD.
APPLICATION FILED NOV. 16, 1921.

1,418,509.

Patented June 6, 1922.

INVENTOR.
Frederick Adams

BY

ATTORNEYS.

UNITED STATES PATENT OFFICE.

FREDERICK ADAMS, OF BRADWELL, ENGLAND.

TRAMWAY RAIL HAVING REMOVABLE TREAD.

1,418,509.        Specification of Letters Patent.     Patented June 6, 1922.

Application filed November 16, 1921. Serial No. 515,482.

*To all whom it may concern:*

Be it known that I, FREDERICK ADAMS, a subject of the King of Great Britain and Ireland, residing at Win Hill View, Bradwell, in the county of Derby, England, have invented Improvements in and Relating to Tramway Rails Having Removable Treads, of which the following is a specification.

This invention relates to tramway rails having detachable wearing treads the object of the invention being to construct said rails in such a manner that the wearing treads may be readily removed when worn and replaced by new ones.

According to this invention the rail is built up of two parts the girder or weight supporting part and the tread or wearing part; the girder portion preferably of I section is provided with a trough on its upper side or flange such trough being formed with a plane horizontal floor and outwardly sloping plane sides; the tread is made with a horizontal base and plane sloping longitudinal sides substantially congruent with the trough in the girder portion above described. The tread is secured at frequent intervals (say three feet centres) to the girder portion by means of screw studs or the like passing through the head of the girder portion and into the tread; holes are provided in the web of the girder or bearer portion immediately below the upper flange for the insertion and accommodation of bolts or the nuts of studs. Spring washers or other known security devices may be used.

A method of carrying out the invention is here described and for this purpose reference is had to a sheet of drawings which accompanies this specification; similar reference letters are used in all the views to refer to the same or similar parts.

Fig. I shews partly in elevation and partly in longitudinal medial section a portion of a track rail constructed after the manner of this invention.

Fig. II shews a complete transverse section of Fig. I on the centre line X—Y of the fixing stud or the like.

Referring to the drawings:—A is the girder portion or bearer with its upper flange $A^1$ formed as a trough with a horizontal plane base $G^1$ and plane outwardly sloping sides G. B is the tread or wearing portion having a base $G^1$ and sloping sides G congruent with those of the trough in $A^1$. F is a hole in the web of A and $F^1$ a hole in the flange $A^1$ immediately over the hole F for the accommodation of a stud C with screwed ends $C^1$ and $C^2$. The end $C^1$ is screwed into the under side of B and the end $C^2$ projects below the flange $A^1$ and into the hole F and is there fitted with a nut E and spring washer D for securing the tread to the bearer. The hole F is made sufficiently large to allow of a spanner being applied to the nut E for screwing it up. The central or body portion of the stud C is preferably formed as shown, that is, having a sectional area larger than that of the screw portions $C^1$ and $C^2$. Studs or the like as C and accommodation for the same are provided at intervals of say three feet along the track and such central body portions serve to prevent any tendency of the tread to creep on the girder.

Having now particularly described and ascertained the nature of my said invention and in what manner the same is to be performed, I declare that what I claim is:—

A track rail with separate bearer and tread portions the bearer having its upper part or flange formed as a trough with plane horizontal base and plane outwardly sloping sides in combination with a tread portion having a base and sides shaped congruently with those of the trough in the bearer: screw studs secured in the base of the tread and projecting downwards through holes in the head of the bearer and into holes in the web of the same and there fitted with washers and nuts for securing the tread to the bearer, the whole in combination and as or substantially as herein described and illustrated by the drawings.

Dated the 23rd day of September, 1921.

In testimony whereof I affix my signature in the presence of two witnesses.

FREDERICK ADAMS.

Witnesses:
ALLAN H. STYRING,
SAML. JAS. A. MILLS.